United States Patent [19]

Kane et al.

[11] Patent Number: 4,501,421

[45] Date of Patent: Feb. 26, 1985

[54] FOOT AND LEG EXERCISING DEVICE

[76] Inventors: James G. Kane, 6157 30th St., N.W., Washington, D.C. 20015; Ernest A. Pedicano, 99 Prospect St., Apt. 2C, Stamford, Conn. 06901; James Pedicano, 120 Glenwood Rd., Ridgewood, N.J. 07450

[21] Appl. No.: 409,142

[22] Filed: Aug. 18, 1982

[51] Int. Cl.[3] .............. A01B 23/04

[52] U.S. Cl. .............. 272/96; 272/132

[58] Field of Search .............. 272/96, 132, 67, 68, 272/131, 133; 188/218 XL, 83

[56] References Cited

U.S. PATENT DOCUMENTS

| | | | |
|---|---|---|---|
| 1,917,261 | 11/1975 | Small et al. . | |
| 2,250,493 | 7/1941 | Milne . | |
| 2,645,482 | 7/1953 | Magida . | |
| 3,022,071 | 2/1962 | Malone et al. . | |
| 3,216,722 | 11/1965 | Odom | 272/132 |
| 3,524,643 | 8/1970 | Hazelitt, Sr. . | |
| 3,525,522 | 8/1970 | Piller | 272/96 |
| 3,802,700 | 4/1974 | Mayo . | |
| 3,942,791 | 3/1976 | Dawson | 272/96 |
| 4,003,374 | 1/1977 | Mizrachy . | |
| 4,159,111 | 6/1979 | Lowth . | |

OTHER PUBLICATIONS

"Pulmonary Embolism", Mayo Clinic Proc. 56:161-168, 1981, by Rosenow, III et al., pp. 162, 175.
Simple Mechanical Method for Decreasing the Incidence of Thromboembolism, by Scurr et al., American Journal of Surgery, vol. 141, May 1981, pp. 582-585.
Pedi-Pulsor publication, Uni-Med Industries Corp.

*Primary Examiner*—Richard J. Johnson
*Attorney, Agent, or Firm*—Oblon, Fisher, Spivak, McClelland & Maier

[57] ABSTRACT

A portable foot and/or leg exercising apparatus for an operator which includes a first and second plate a mechanism for pivotally connecting said first and second foot plate together, centrally positioned between the first and second plate and extending vertically from each of the first and second plates and a mechanism disposed within or around the pivot mechanism extending from the first and second plates and operably associated with the pivot mechanism and coaxial therewith for providing a resistant force to pivoting of the first and second plates wherein the first plate is pivoted in a clockwise direction by the toes of one foot of the operator and wherein the second plate is pivoted in a counterclockwise direction by pressure from the anterior aspect of the other foot of the operator so as to cause muscular actions of the foot and/or leg of the operator.

10 Claims, 12 Drawing Figures

FOOT AND LEG EXERCISING DEVICE

BACKGROUND OF THE INVENTION

1. Field of the Invention

The present invention relates to a foot and/or exercising device for medical purposes.

2. Description of the Invention

Seriously ill patients who have been at prolonged bedrest have been found to be at risk for the development of deep venous thrombosis. More particularly, patients who have congestive heart failure, those with recent myocardial infarction, patients with malignant disease, and those with various shock syndromes are at greatest risk. Other predisposing conditions are polycythemia vera, dysproteinemias, antithrombin III deficiency, high-dose estrogen treatment as an oral contraceptive, pregnancy, obesity, and sickle cell anemia. Patients more than sixty years old have an increased incidence of deep venous thrombosis compared with those in younger age groups. Varicose veins and prior venous thromboembolic disease also predispose a person to deep venous thrombosis. Postoperative deep venous thrombosis occurs with increased frequency in patients with pelvic, abdominal, and thoracic surgery and in those who have had orthopedic procedures. Posttraumatic deep venous thrombosis is also a major clinical problem, particularly in patients who have been immobilized for prolonged periods and who have any of the other predisposing problems enumerated above.

A number of physical methods for the preventing of deep venous thrombosis in patients at risk are in wide use. All of these methods depend basically on the concept of improving venous hemodynamics and flow to reduce venous stasis in the lower extremeties and thereby inhibit development of deep venous thrombosis. Early ambulation, though not critically tested, is widely accepted as effective prophylaxis. Leg elevation and active and passive leg exercises also have a rational basis for use in reducing deep venous thrombosis. Electrical muscle stimulation intraoperatively has been shown to be effective in reducing deep venous thrombosis but has a number of disadvantages and has not achieved wide clinical application. Properly designed and properly applied elastic compression stockings have been shown in some studies to be effective in prophylaxis and are widely used. Also receiving attention in recent years has been intermittent external pneumatic compression, which has been shown to be effective in the prevention of deep venous thrombosis. Patients with malignant diseases are at increased risk for deep venous thrombosis and do not respond as favorably to physical methods or prophylaxis as patients with non-malignant diseases. This information is reviewed in greater detail in the publication entitled "Pulmonary Embolism, Mayo Clinic Proc.", 56:161-168, 1981, particularly pages 162 and 165 by Rosenow III et al.

As reflected from the above discussion, U.S. Pat. No. 4,159,111 to Lowth discloses a leg exerciser for medical purposes which includes a treddle apparatus including a base for a pair of foot pedals mounted thereon. It is apparent, however, that this apparatus is of a complex nature regarding the number of elements that are necessary for operative interengagement so as to provide leg exercise for a patient. A similarly complex foot exercising device is shown in U.S. Pat. No. 3,917,261 which includes a pair of foot holders pivotably secured within a housing and which utilizes a powering motor which drives the foot holders by means of rigid actuating links which are driven by eccentric connection to the motor. U.S. Pat. No. 3,022,071 to Malone et al also discloses a complex foot exercising device which includes at least a first and seconds floatingly mounted spring connected to rear faces of each pedal at a point adjacent the heels thereof.

SUMMARY OF THE INVENTION

Accordingly, the object of the present invention is to provide an inexpensive medical device to prevent pulmonary embolism which is therefore effective in function while being reduced in complexity.

The present invention has been based upon the realization that a predisposition to pulmonary embolism de facto implies venous stasis and, more specifically, lack of use of the muscle pump of the lower extremities. It is the muscular action of the lower extremities that has been recognized as allowing the blood to rise in the veins through the legs and thighs and ultimately into the inferior vena cava and onward back to the heart. When this muscle pump is put to rest, such as bed rest, it has been recognized that there is diminished blood flow and stasis and subsequently coagulation and formulation of a clot which can then separate and flow to the lungs. The object of the present invention is therefore to provide a device that can be easily utilized by patients of whatever degree of debilitation, other than comotose, that will simply allow patients to utilize the same muscle pump during their hospitalization or, in fact, during periods of inactivity, even to prolonged riding in a vehicle.

The basic principal of the present invention is to supply a device which demands that, in order to be activated, the same muscle pump which is normally used in promoting venous flow is utilized. This is done primarily by extreme flexion and extension of the foot and leg against resistance on repeated movements. Appropriate use of this device, including an optional counting device to assure appropriate utilization, should dramatically diminish the risk at which patients find themselves for pulmonary embolism.

In accordance with the present invention, a portable foot and leg exercising apparatus for an operator is utilized which includes a first and second foot plate, means for pivotally connecting said first and second plates, centrally positioned between the first and second plates and extending vertically from each of the first and second plates and means disposed within or around said pivot means extending from said first and second plates and operatively associated with said pivot means and coaxial therewith for providing a resistant force to pivoting of said first and second foot plates such that as the first plate is pushed downwardly by the toes of one foot of the operator the second plate is moved upwardly by pressure from the anterior aspect of the outer foot of the operator so as to cause muscular actions of the foot and leg of operator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
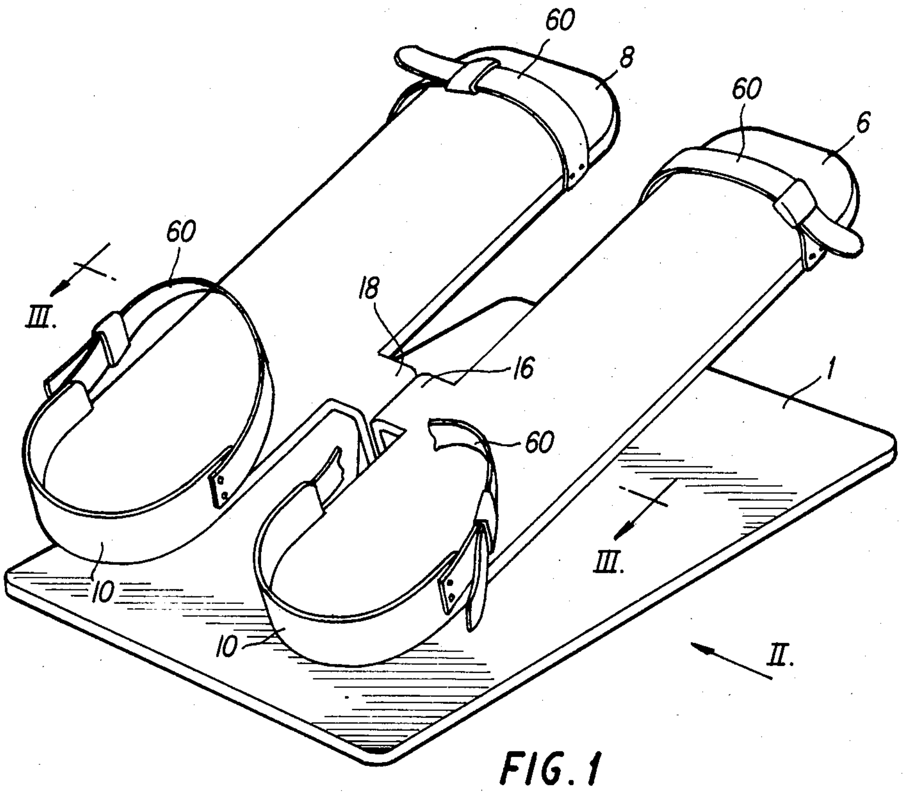
FIG. 1 is a perspective view of the present invention.

Referring now to FIGS. 1–7B, the portable foot and leg exercising apparatus in accordance with the present invention includes an optional base 1 which can be made of metal or of a strong, durable molded plastic material. Reference numeral 2 indicates an optional central support member upwardly extending from base 1 which can be a solid member or a member which is hollowed out.

A pivot pin 4 which is either an integral extension of or horizontally connected with and extending from support member 2 is disposed beneath a first tread plate 6 for the right foot of the patient or operator as well as a second tread plate 8 for the left foot of the patient or operator wherein the first and second tread plates are of similar construction and are also made of metal or durable plastic, for example. It is understood that support member and pivot pin 4 could be alternatively positioned above plates 6, 8. A heel rest member 10 is provided so as to be integral with tread plates 6, 8 or attachable thereto. Reference numerals 12 and 14 serve to designate, respectively, hubs or lugs extending from tread plate 6 and tread plate 8.

A flange 16 extends centrally with respect to base 1 from tread plate 6 and interconnects tread plate 6 with lug 12. Correspondingly, flange 18 extends centrally from tread plate 8 and interconnects tread plate 8 with lug 14. An aperture 20 is formed in lug 12 while a corresponding aperture 22 is formed in lug 14 for insertion thereof of pivot pin 4. A slot 24 is also formed in lug 12 while a corresponding slot 26 is formed in lug 14. A pin 28 projects from lug 12 for operative insertion in slot 24 while a corresponding pin 30 projects from lug 14 for operative insertion in slot 26.

Figure 7A:
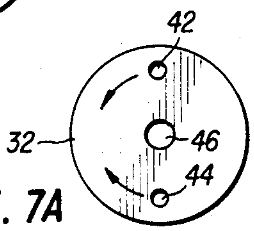
FIG. 7A is an elevational view of a first embodiment of the force resistant disc of the present invention.

As best shown in embodiment of FIG. 7A, a force resistant, deformable disc 32 is positioned between lug 12 and lug 14 so as to contact the same or be positioned a predetermined distance therefrom and is made of rubber or a similar material that provides a desirable resilient, deformable characteristic. A radially disposed first opening or aperture 42 is provided in disc 32 for insertion of pin 30 while a corresponding radially disposed second opening or aperture 44 is provided on an opposite side of disc 32 for insertion of pin 28. A central opening or aperture 46 is also provided in disc 32 through which passes pivot pin 4 during assembly of the foot and leg exercising device.

Figure 7B:
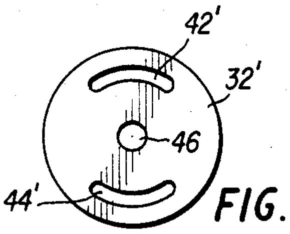
FIG. 7B is an elevational view of a second embodiment of the force resistant disc of the present invention.

In the embodiment shown in FIG. 7B, a force resistant disc 32 is positioned between lug 12 and lug 14 and is made of rubber or a similar material that provides a desirable friction surface. More particularly, reference numeral 34 designates a first force resistant surface of disc 32' while reference numeral 36 designates a contact surface portion of lug 12 for frictionally contacting surface 34. Reference numeral 38 denotes a second resistant surface of disc 32' while reference numeral 40 indicates a contact surface portion of lug 24 for frictionally contacting surface 38 upon assembly of the foot and leg exercising device as best shown in FIG. 4.

A radially disposed and slotted first opening or aperture 42' is provided in disc 32 for insertion of pin 30 while a corresponding radially disposed and slotted second opening or aperture 44' is provided on an opposite side of disc 32' for insertion of pin 28. A central opening or aperture 46 is also provided in disc 32' through which passes pivot pin 4 during assembly of the foot and leg exercising device. At least one projection 48 is formed at one end portion of pivot pin 4 for engagement with a surface portion 51 of lug 12 upon being extended through opening 22, opening 46 and opening 20 during assembly.

Figure 3:
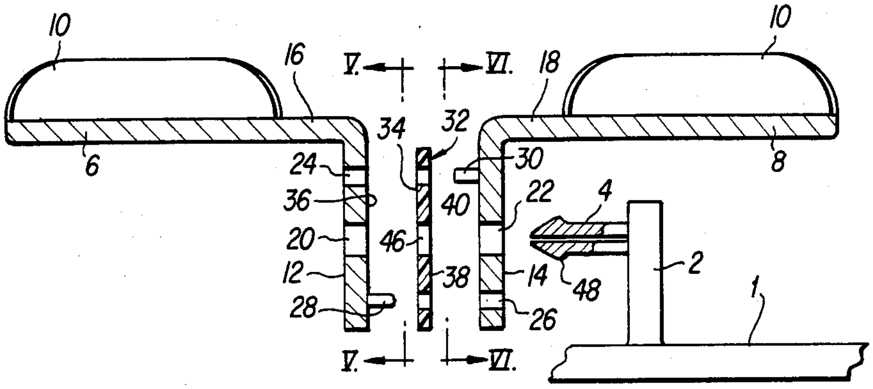
FIG. 3 is a vertical cross-sectional view taken along line III—III of FIG. 1 showing the components thereof exploded.
Figure 4:
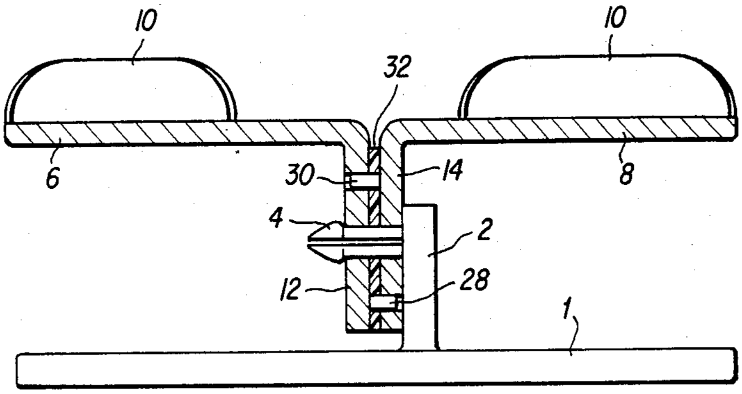
FIG. 4 is a view similar to FIG. 3 but showing the components in their assembled state.
Figure 5:
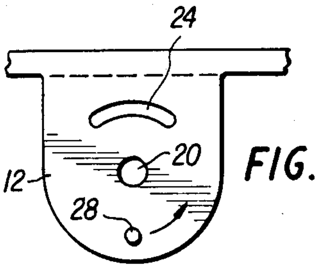
FIG. 5 is a fragmentary elevational view taken along line V—V in FIG. 3.
Figure 6:
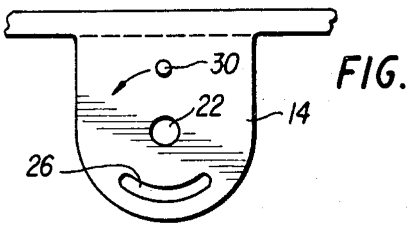
FIG. 6 is a fragmentary elevational view taken along line VI—VI in FIG. 3.

As can be appreciated from FIGS. 3 and 4, the method of assembly begins with the orientation of disc 32 between lugs 12 and 14 so as to allow for insertion of pin 28 into radially disposed aperture 44 and slot 26 as well as allowing for insertion of pin 30 into radially disposed aperture 42 and slot 24. This combined assembly is therefore oriented so as to allow for passage of pivot pin 4 through openings 22, 46 and 20 and to allow for engagement of the at least one projection 48 with surface portion 51 of lug 12. A similar method of assembly is used when using disc 32.

Figure 2:
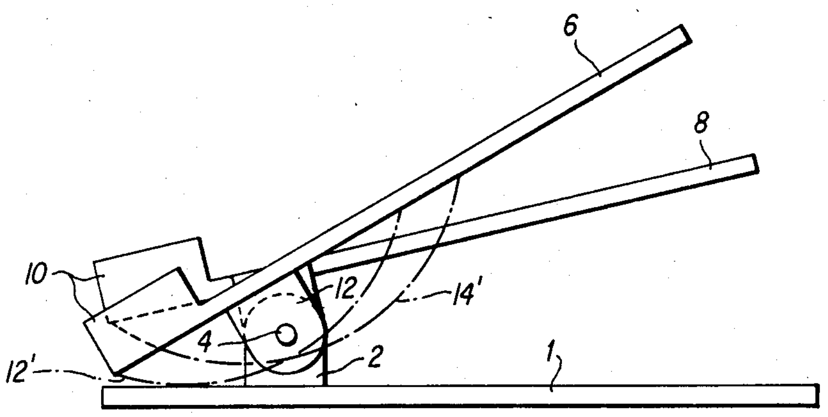
FIG. 2 is a right side view taken in the direction of arrow II in FIG. 1 and also shows an alternate embodiment of the lugs in broken lines.

In operation when using disc 32, movement of pedal 6 against downward pressure applied by one foot of the patient or operator will force such pedal to pivot or rotate in a clockwise direction as viewed in FIG. 2 and to allow for stationary positioning (if the operator's other foot on pedal 8 is held stationary) or counterclockwise rotation (if the operator's other foot is so moved) of pedal 8. During such movement, the pins 28, 30 engage apertures 42, 44 and apply a compression force in the direction shown by the arrows in FIG. 7A so as to partially deform disc 32 up to a predetermined limit depending upon the elasticity characteristic of disc 32 and how tightly disc 32 is positioned against contact surfaces 36, 40. Therefore, through the use of interchangeable discs 32 with differing deformation characteristics, the force resistant operational characteristics of the device can be modified to adjust for the physical ability of the individual patient or operator.

In operation when using disc 32', movement of pedal 6 against pressure applied by one foot of the patient or operator will force such pedal to pivot or rotate in a clockwise direction as viewed in FIG. 2 and to allow for a counterclockwise rotation of pedal 8 by the other foot. During such movement, the force resistant or friction surfaces 34, 38 of resistance disc 32 respectively contact surface portion 36, 40 of lugs 12 and 14 while still allowing for pivoting of lugs 12 and 14 about pivot pin 4. During operation of the foot and leg exercising device using disc 32', pin 30 is able to travel within the confines of slot 24 and lug 12 as well as slotted opening or aperture 42' in disc 32' while pin 28 is able to travel within the confines of slot 26 of lug 14 and slotted opening or aperture 44' of disc 32'. Radially opposite end portions of slots 24 and 26, and/or slotted openings or apertures 42', 44' can therefore serve as stop members. The above-noted structural elements therefore allow for pivoting or rotation of plate 6 with respect to plate 8 in a desired manner for maximum frictional resistance of disc 32' and therefore maximum exercise of the patient or operator.

Figure 8:
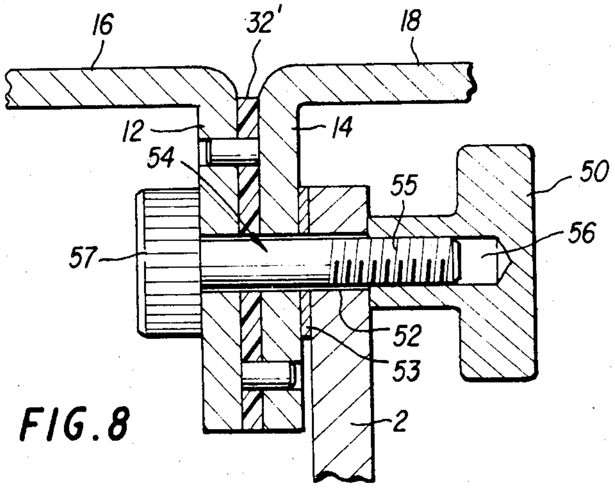
FIG. 8 is a fragmentary, vertical, cross-sectional view similar to FIG. 3 but showing an alternate embodiment of the present invention.

FIG. 8 illustrates an alternate embodiment of the present invention when utilizing disc 32' wherein reference numeral 50 designates a hand wheel, reference numeral 51 denotes a surface portion of hub 12 and reference numeral 52 designates an aperture in support member 2. A screw threaded bolt 54 includes a threaded portion 55 whereas a threaded portion 56 is provided within the interior portion of hand wheel 50 for cooperative engagement with threaded portion 55. Reference numeral 57 designates the head of bolt 54 while reference numeral 58 denotes an optional washer disposed between lug 14 and support member 2. It should also be noted that a pair of fasteners 60 on each tread plate 6, 8 can also be utilized for securing the patient's or operator's foot during operation in each embodiment. It can therefore be appreciated that if a patient or operator is not sufficiently strong or able to move one foot and resists the movement of the other foot on respective plates 6, 8, the structure shown in FIG. 8 allows an adjustable amount of resistance to movement of plate 6, 8 with respect to disc 32' as is suitable to that particular patient. Hand wheel 50 can be gripped by the patient or operator and allows for adjustment of frictional resistance of disc 32' by tightening the engagement of lug 12 and lug 14 against the corresponding surfaces of disc 32' via threaded engagement of threaded portion 55 of bolt 54 with respect to threaded portion 56 of hand wheel 50.

Figure 9:
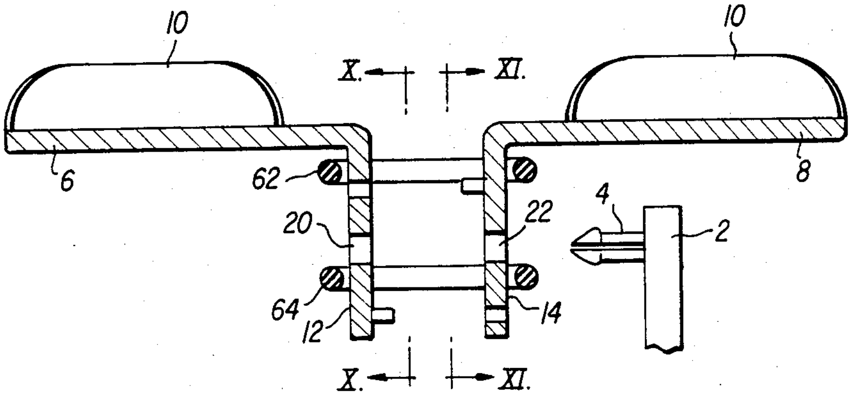
FIG. 9 is a vertical cross-sectional view similar to that of FIG. 3 but showing yet another alternate embodiment of the present invention.
Figure 10:
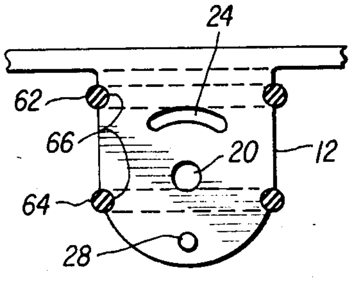
FIG. 10 is a fragmentary elevational view taken along line X—X in FIG. 9.
Figure 11:
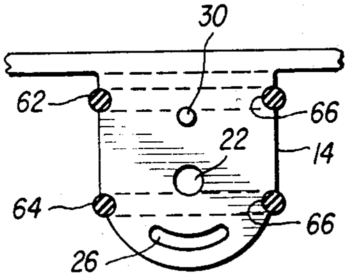
FIG. 11 is a fragmentary elevational view taken along line XI—XI in FIG. 9.

A still further embodiment is illustrated in FIGS. 9–11 wherein the structure is identical to that shown in FIG. 3 but where no disc 32 is utilized. Instead a first and second elastic band 62, 64 is used for filling engagement with a series of notches or indentations 66 formed in side surface portions of lugs 12, 14 and bands 62, 64 serve to surround lugs 12, 4. In this embodiment, assembly is identical to that in FIG. 3 except that disc 32 is not inserted between lugs 12, 14. Rather, after interfitting of pin 30 into slot 24 and pin 28 into slot 26 and insertion of pivot pin 4 through apertures 20, 22, elastic bands 62 and 64 are held by the elastic characteristic of each band so as to be securely positioned in notches or indentations 66. In operation of this embodiment, movement of pedal 6 against downward pressure applied by one foot of the patient or operator will force such pedal to pivot or rotate in a clockwise direction as viewed from the left side of FIG. 9 and to allow for reverse pivoting or rotation in a counterclockwise direction of the operator's other foot on pedal 8 (if the operator's other foot is so moved). During such movement the pins 28, 30 fit within slots 26, 24 respectively, and elastic bands 62, 64 are stretched due to rotationed movement of notches 66 of lug 12 with respect to notches 66 of lug 14. Of course, elastic bands 62, 64 are selected so as to have an acceptable resistance to be stretched so as to require the desired muscular exertion of the operators legs or feet and these bands can be selected depending on the physical condition of the operator.

A final embodiment which can be used in conjunction with the embodiments in FIGS. 1–11 is shown by the broken lines in FIG. 2 wherein lugs 12' and 14' extend downwardly from plates 6 and 8, respectively, and which are interconnected by pin 4 and wherein support member 2 and base 1 are not utilized. Lugs 12' and 14' have an arcuate lower edge portion and can extend from the general area of the heel of each plate 6, 8 to a position between the heel and toe of each plate. This allows for more convenient use of the apparatus in bed for a bedridden patient. This embodiment is assembled in a manner similar to that of FIGS. 1–7B but wherein a head (not shown) is formed at an end of pin 4 opposite that end which has projections 48, for cooperation with the side portion of lug 14. Alternatively, the head could be of a structure similar to that of projections 48 and cooperate with the side portion of lug 14.

From the foregoing, it can be recognized that the present foot and leg exercising device can be utilized if a patient is bedridden or if he has a limited degree of mobility. As an example, if the patient is absolutely lying flat on his back, the apparatus could be propped against the foot of a bed and the patient can therefore be allowed to exercise his legs lying flat on his back. Furthermore, if a patient is partly mobile, he can exercise his feet or legs on the apparatus while performing other functions such as reading.

Obviously, numerous modifications and variations of the present invention are possible in light of the above teachings. It is therefore to be understood that within the scope of the appended claims, the invention may be practiced otherwise than as specifically described herein. What is claimed as new and desired to be secured by Letters Patent of the United States is:

1. A portable foot and/or leg exercising apparatus for an operator, comprising:

a base having a support member mounted thereon;
pivot means mounted on said support member;
a first and second foot plate positioned on opposite sides of said support member;
means centrally positioned between said first and second plates and extending vertically from each of said first and second plates pivotally mounting said first and second plates on opposite sides of said support member wherein said pivot means comprises a first hub extending from said first plate and a second hub extending from said second plate; and
means disposed surrounding said pivot means and coaxial therewith for resisting respective pivoting of said first and second foot plates wherein said means for resisting respective pivoting comprises a force resistant friction disk mounted on said pivot member and disposed between said first and second hub for frictional engagement therewith; the first plate is pivoted in a clockwise direction by the toe of one foot of the operator; and wherein the second plate is pivoted in a counterclockwise direction by pressure from the anterior aspect of the other foot of the operator so as to cause muscular action of the foot and/or leg of said operator.

2. An apparatus as set forth in claim 1, wherein said resisting means further comprises at least one elastic band surrounding said pivot member.

3. An apparatus as set forth in claim 2 wherein said first and second hub each having a plurality of notches formed therein for cooperative engagement with said at least one elastic band.

4. An apparatus as set forth in claim 1, wherein said resistant disc has a central aperture formed therein and a first and second radially disposed aperture formed therein and wherein said pin member of said first hub is disposed in said first aperture of said resistant disc, said pin member of said second hub is disposed in said second aperture of said resistant disc and said pivot means is positioned in said aperture of said first and second hub.

5. An apparatus as set forth in claim 4 wherein said radially disposed apertures further comprise radially disposed slotted apertures.

6. A portable foot and/or leg exercising apparatus for an operator, comprising:

a base having a support member mounted thereon;

pivot means mounted on said support member;

a first and second foot plate positioned on opposite sides of said support member;

means centrally positioned between said first and second plates and extending vertically from each of said first and second plates pivotally mounting said first and second plates on opposite sides of said support member wherein said pivot means comprises a first hub extending from said first plate and a second hub extending from said second plate;

means disposed surrounding said pivot means and coaxial therewith for resisting respective pivoting of said first and second foot plates wherein said means for resisting respective pivoting comprises a deformable, force resistant disk mounted on said pivot member and disposed between said first and second hub for frictional engagement therewith; the first plate is pivoted in a clockwise direction by the toe of one foot of the operator; and wherein the second plate is pivoted in a counterclockwise direction by pressure from the anterior aspect of the other foot of the operator so as to cause muscular action of the foot and/or leg of said operator; and said first and second hub each have a first and second aperature formed therein, respectively, and a pin member extending therefrom and wherein said pin member of said first hub is positioned in said first aperature of said second hub, said pin member of said second hub is positioned in said first aperature of said first hub and said pivot means is positioned in said second aperature of said first and second hub.

7. An apparatus as set forth in claim 4, wherein said resistant disk has a central aperature and a first and second radially disposed aperature formed therein and wherein said pin member of said first hub is disposed in said first aperature of said resistant disk, said pin member of said hub is disposed in said second aperature of said resistant disk, and said pivot means is positioned in said central aperature of said resistant disk.

8. An apparatus as set forth in claim 7, further comprising means mounted on said support member for adjusting the resistant force of said resistant disk.

9. An apparatus as set forth in claim 7, wherein said pivot member further comprises a pivot pin horizontally extending from said support member, said pivot pin having at least one projection extending therefrom for engagement with a surface portion of said first hub.

10. An apparatus as set forth in claim 7, wherein said radially disposed aperatures of said first and second hub further comprise radially disposed slotted aperatures.

* * * * *